April 28, 1970              H. PILZ              3,508,932
APPARATUS FOR TREATING A CHOCOLATE MASS
Filed Dec. 6, 1966
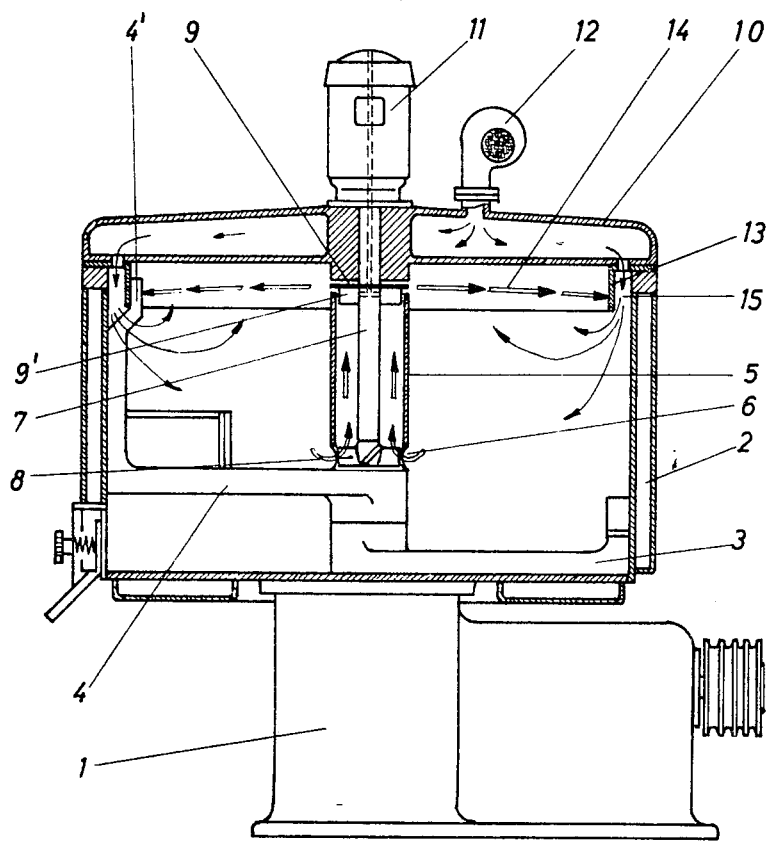
INVENTOR.
HERBERT PILZ, DECEASED
BY GERTRUD PILZ, EXECUTRIX
BY
Leonard H. King
ATTORNEY

United States Patent Office 3,508,932
Patented Apr. 28, 1970

3,508,932
APPARATUS FOR TREATING A CHOCOLATE MASS
Herbert Pilz, deceased, late of Frankfurt am Main, Germany, by Gertrud Pilz, heir, Zeppelin-Allee 37, Frankfurt am Main, Germany
Filed Dec. 6, 1966, Ser. No. 600,692
Int. Cl. A23g 1/00
U.S. Cl. 99—236          2 Claims

ABSTRACT OF THE DISCLOSURE

An apparatus for stirring a mass of chocolate and centrifugally dispersing the chocolate through an air mass for aeration thereof.

---

This invention concerns a process for the treatment of chocolate masses and also concerns a machine for carrying out such process.

Reference will hereafter be made, by way of example, to the treatment of chocolate masses and to the mixing and texturing machine called a "conche." Such conches are known in various forms. A distinction is made between two important types, firstly longitudinal grinders and secondly round conches with vertically or horizontally extending drums or vessels.

Although the longitudinal grinders are very cumbersome, taking up much plant space and are expensive machines to operate, they are valued particularly on account of the effects which result from their special construction, i.e., the chocolate masses are intensively aerated therein, which becomes especially noticeable as regards refining. In comparison therewith, the round conches have, as regards space requirements, the advantage of a larger capacity and require a considerably shorter tumbling time. However, refining of the chocolate therein is not possible to the same degree as in the longitudinal grinders. Attempts have therefore been made to combine the advantages of one machine with those of the other.

A further object of this invention is to provide a machine in which an intensive aeration of the dispersed mass is achieved by means of a forced conduction of the media involved.

According to the present invention, there is provided a process in which the raised mass is sprayed in the form of a closed dispersion. The dispersion air, such as oxygen-enriched, filtered air or the like, is introduced and discharged from the vessel so that it passes through the dispersion while the main part of the mass in the vessel is further circulated in a known manner.

A machine which is particularly suitable for carrying out the process consists of a vessel which can be heated and cooled and is open on the upper side of scrapers scraping the walls thereof and rotating therein, stirring members and means for the supply of fresh air. There is further included a rising pipe which is centrally mounted in the trough and open at the bottom and top, in which in the vicinity of the lower opening an impeller member is mounted on a shaft, while in the vicinity of the upper opening a centrifugal disc is mounted thereon. According to the present invention, this machine is characterized in that in the vicinity of the inner upper edge of the vessel and of the periphery of the dispersion, an air feed passage is provided, the air outlets of which lie below the plane of the centrifugal disc.

According to the process and machine of this invention, a dispersion of material is produced which advantageously is not disturbed in any way, i.e., one which is not broken at various points by mechanical elements and which, so to speak, tightly seals the interior space of the vessel above the mass therein so that the preferably filtered and oxygen-enriched air introduced between the dispersion of material and the mass of material can only flow away through the dispersion in the upward direction. As a result each particle of the material is necessarily intensively circulated by the passing air and thus aerated.

One embodiment of a machine according to the invention and by way of example, is shown diagrammatically in the accompanying drawing. The machine has a double wall vessel 2 mounted on a drive 1, in which vessel scraper members 3 and 4, driven from below, are mounted. A rising pipe 5 with inlets 6 at the lower end is mounted on the hub of scraper 4. In pipe 5 a shaft 7 extends from above, which shaft, in the vicinity of the inlets 6, is provided with an impeller 8. In the vicinity of the upper edge of the rising pipe 5 a centrifugal disc 9 is mounted. Shaft 7 is driven by a motor 11 mounted on cover 10 of the vessel. This cover is advantageously made hollow and at the same time carries a fresh air blower 12 upstream of which filters and oxygen enrichment elements or the like can be arranged.

In order to convey the fresh air supplied by the blower 12 to beneath the dispersion of material which, in operation, will be produced by the centrifugal disc 9, without thereby disturbing this dispersion by pipes or the like passing therethrough, an annular wall section 13 is mounted concentrically with the upper edge of vessel 2. The wall section 13 is so arranged that its lower edge lies below the periphery of the point of impact of the dispersed material. An air passage 15 formed by the section 13 and the vessel's edge communicates directly or indirectly with the blower 12 via the cover 10. The upper end 4' of the stirring member 4 is preferably offset in such a manner that it can scrape the inner surface of the section 13 as well as vessel 2. Due to this construction of the machine, the production of an undisturbed dispersion of material and the supply of fresh air to beneath the dispersion are ensured.

It is also possible to make the shaft 7 from above to below the centrifugal disc 9 as a hollow shaft and to provide it beneath the centrifugal disc with radial bores for introduction of air. In order to avoid clogging of these bores, the centrifugal vanes 9 of the centrifugal disc 9 are formed as hollow channels and mounted on the openings of the bores.

In operation scrapers 3 and 4 stir the large mass of chocolate at the lower portion of the vessel with the arms thereof scraping the side walls and with end 4' scraping section 13. The impeller arrangement draws a portion of the chocolate mass upward through the tube 5 so that it may be centrifugally dispersed at high velocities by disc 9. The dispersed chocolate impinges on section 13 and then returns by gravity to the main portion of the chocolate mass.

The interaction of the dispersed chocolate and the air flow is indicated in the drawing by two different types of arrows. The single line arrow represents air flow and the double line arrow represents the flow of the centrifugally dispersed chocolate. Therefore, it will be appreciated that the air flows downwardly through passages 15 and then radially inward to the chocolate mass. The dispersed chocolate flows downwardly, in curtain form, through the moving air whereby the chocolate is fully aerated.

Having thus disclosed the best embodiment of the invention presently contemplated, it is to be understood that various changes and modifications may be made by those skilled in the art without departing from the spirit of the invention.

What is claimed is:

1. A machine for treating a mass of chocolate comprising:
   (a) a hollow vessel;
   (b) at least one rotatably mounted member arranged to stir the chocolate and scrape the inside wall of said vessel;
   (c) means to drive said rotatable member;
   (d) a hollow tube centrally disposed in said vessel above said rotatably mounted member, said tube having inlet and outlet means at the bottom and top ends thereof, respectively;
   (e) a driven shaft coaxially disposed within said hollow tube, said shaft having impeller means at the bottom end thereof proximate the inlet means of said tube, said impeller means being located within the chocolate mass and arranged to raise a portion thereof through said hollow tube;
   (f) means to drive said shaft;
   (g) a disc integral with said shaft and positioned proximate the outlet means of said tube, said disc being adapted to centrifugally disperse the portion of chocolate raised through the tube;
   (h) air supply means in communication with the interior of said vessel;
   (i) a cover member enclosing said vessel; and
   (j) a ring-shaped member depending downwardly from the underside of said cover to define an annular chamber in combination with the inside wall of said vessel, the lowest level of said chamber being below the plane of said disc, said air supply means being in communication with said annular chamber.

2. The apparatus in accordance with claim 1 including means to scrape the inside surface of said ring-like member.

References Cited
UNITED STATES PATENTS

| | | | |
|---|---|---|---|
| 2,255,986 | 9/1941 | Rapisarda | 99—236 |
| 2,831,418 | 4/1958 | Ponisch | 99—236 |

ROBERT W. JENKINS, Primary Examiner

U.S. Cl. X.R.

107—31